United States Patent
Schuldt

(10) Patent No.: US 12,139,872 B2
(45) Date of Patent: Nov. 12, 2024

(54) FOUNDATION FOR A WIND POWER PLANT

(71) Applicant: HOLCIM TECHNOLOGY LTD, Zug (CH)

(72) Inventor: Christian Schuldt, Holderbank (CH)

(73) Assignee: HOLCIM TECHNOLOGY LTD, Zug (CH)

( * ) Notice: Subject to any disclaimer, the term of this patent is extended or adjusted under 35 U.S.C. 154(b) by 299 days.

(21) Appl. No.: 17/434,518

(22) PCT Filed: Feb. 21, 2020

(86) PCT No.: PCT/IB2020/051465
§ 371 (c)(1),
(2) Date: Aug. 27, 2021

(87) PCT Pub. No.: WO2020/174334
PCT Pub. Date: Sep. 3, 2020

(65) Prior Publication Data
US 2022/0145573 A1   May 12, 2022

(30) Foreign Application Priority Data
Feb. 28, 2019   (AT) .................... A 79/2019

(51) Int. Cl.
*E02D 27/42*   (2006.01)
*E02D 27/01*   (2006.01)
(Continued)

(52) U.S. Cl.
CPC ......... *E02D 27/425* (2013.01); *E02D 27/016* (2013.01); *F03D 13/22* (2016.05); *E02D 2200/1664* (2013.01); *E04H 12/2269* (2013.01)

(58) Field of Classification Search
CPC .......... E02D 27/425; E02D 2200/1664; E02D 27/016; E02D 27/42; F03D 13/22; E04H 12/2269
See application file for complete search history.

(56) References Cited

U.S. PATENT DOCUMENTS 5,224,313 A * 7/1993 Guillebeau, III ..... E02D 27/425
52/297
9,096,985 B1   8/2015 Phuly
(Continued)

FOREIGN PATENT DOCUMENTS

AT           517958 A4   6/2017
AU     2014 265 049 B1   10/2015
(Continued)

OTHER PUBLICATIONS

Machine translation of DK 200000612 A provided by IP.com (last accessed on Sep. 20, 2023) (Year: 2001).*
(Continued)

*Primary Examiner* — Kyle J. Walraed-Sullivan
(74) *Attorney, Agent, or Firm* — Pillsbury Winthrop Shaw Pittman LLP

(57) ABSTRACT

A foundation for a wind power plant includes a circular or polygonal pedestal divided into several ring sections for carrying a tower and support elements extending radially outward from the pedestal, wherein the ring sections and the support elements are designed as prefabricated concrete elements or are assembled from prefabricated concrete elements, and wherein adjacent support elements are spaced from one another in the circumferential direction, adjacent support elements are each connected with one another by a tangentially extending beam designed as a prefabricated concrete element.

11 Claims, 2 Drawing Sheets

Figure 1:
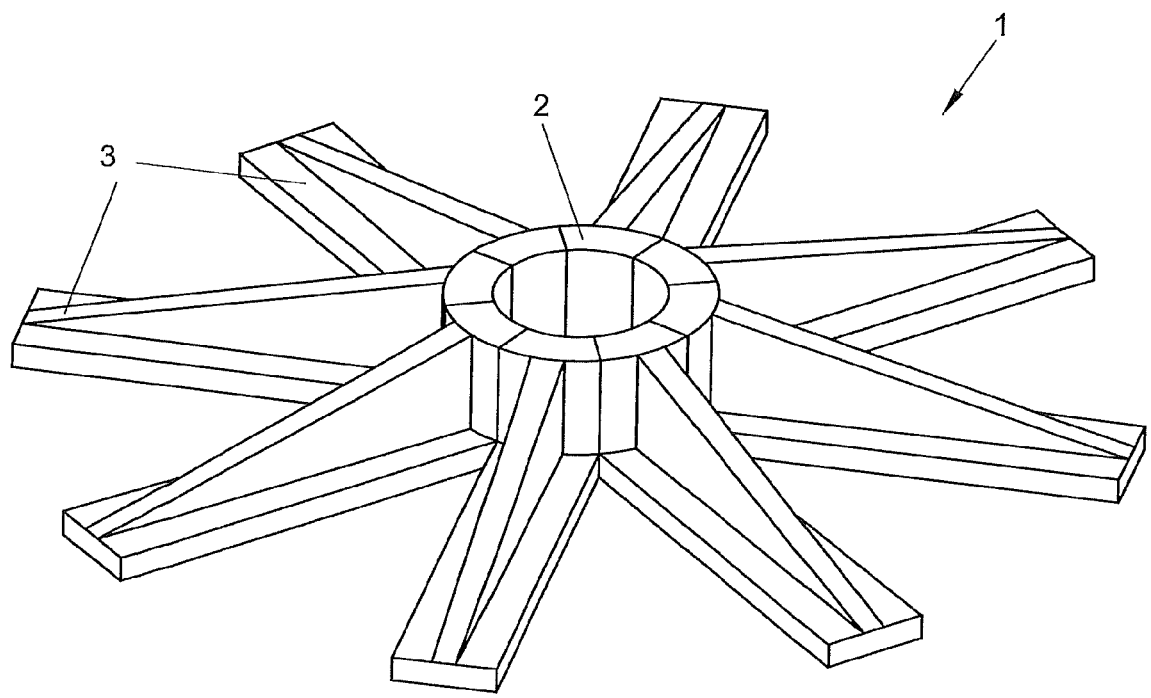

(51) Int. Cl.
  *E04H 12/00* (2006.01)
  *F03D 13/20* (2016.01)
  *E04H 12/22* (2006.01)

(56) References Cited

U.S. PATENT DOCUMENTS

| | | | | |
|---|---|---|---|---|
| 9,347,197 | B2* | 5/2016 | Phuly | E02D 27/425 |
| 9,499,954 | B2* | 11/2016 | Shi | E02D 27/02 |
| 9,534,405 | B1* | 1/2017 | Phuly | E04C 5/08 |
| 10,260,480 | B2* | 4/2019 | Beramendi Ortega | E02D 5/223 |
| 11,293,407 | B1* | 4/2022 | Wang | E02D 27/42 |
| 11,479,982 | B2* | 10/2022 | Forrester | E04G 13/00 |
| 2007/0181767 | A1* | 8/2007 | Wobben | F03D 13/22 248/678 |
| 2008/0072511 | A1* | 3/2008 | Phuly | F03D 13/20 52/294 |
| 2010/0043318 | A1* | 2/2010 | Armbrecht | E02D 27/425 52/297 |
| 2011/0061321 | A1 | 3/2011 | Phuly | |
| 2012/0047830 | A1* | 3/2012 | Phuly | E02B 17/025 52/294 |
| 2012/0167499 | A1* | 7/2012 | Knisel | F03D 13/22 52/231 |
| 2012/0228442 | A1* | 9/2012 | Clifton | F24S 25/10 248/163.1 |
| 2013/0291454 | A1* | 11/2013 | Jolly | E02D 27/42 52/169.13 |
| 2013/0326970 | A1* | 12/2013 | Prass | E02D 27/42 52/169.1 |
| 2014/0205384 | A1* | 7/2014 | French, Sr. | E02D 17/202 405/229 |
| 2014/0290161 | A1* | 10/2014 | Zavitz | E04H 12/342 52/223.14 |
| 2015/0121784 | A1* | 5/2015 | Abad Huber | E02D 27/016 52/297 |
| 2015/0225918 | A1* | 8/2015 | Phuly | E04G 21/02 52/297 |
| 2015/0308140 | A1* | 10/2015 | Clifton | E02D 27/42 248/346.2 |
| 2015/0376859 | A1* | 12/2015 | Phuly | E04H 12/341 52/294 |
| 2017/0030045 | A1* | 2/2017 | Krause | E04H 12/2269 |
| 2017/0204836 | A1* | 7/2017 | Jimeno Chueca | E02D 27/425 |
| 2018/0073487 | A1* | 3/2018 | Beramendi Ortega | E02D 27/425 |
| 2018/0258604 | A1* | 9/2018 | Coordes | F03D 13/22 |
| 2019/0055711 | A1* | 2/2019 | Schuldt | E02D 27/42 |
| 2019/0063029 | A1* | 2/2019 | Schuldt | F03D 13/22 |
| 2019/0085583 | A1* | 3/2019 | Serna García-Conde | E04H 12/34 |
| 2019/0226174 | A1* | 7/2019 | Schuldt | E02D 27/425 |
| 2020/0018035 | A1* | 1/2020 | Schuldt | E04H 12/08 |
| 2021/0222389 | A1* | 7/2021 | Stecher | E04H 12/2269 |
| 2021/0222677 | A1* | 7/2021 | Stecher | F03D 13/22 |
| 2022/0061480 | A1* | 3/2022 | Nguyen | A45B 23/00 |
| 2022/0145573 | A1* | 5/2022 | Schuldt | F03D 13/22 |
| 2023/0340750 | A1* | 10/2023 | Alonso Gainza | E02D 27/425 |
| 2024/0003112 | A1* | 1/2024 | Prass | E02D 27/016 |

FOREIGN PATENT DOCUMENTS

| | | | | |
|---|---|---|---|---|
| CA | 2916228 | A1 * | 6/2017 | E02D 27/016 |
| CN | 1873112 | A | * 12/2006 | |
| CN | 101503880 | A | * 8/2009 | |
| CN | 201428138 | Y | * 3/2010 | |
| CN | 102720208 | A | * 10/2012 | |
| CN | 202627017 | U | 12/2012 | |
| CN | CN 204174634 | U | 2/2015 | |
| CN | 204738307 | U | * 11/2015 | |
| CN | 205369295 | U | 7/2016 | |
| CN | 107829444 | A | 3/2018 | |
| CN | 106958259 | B | 1/2019 | |
| DE | 102015203574 | A1 * | 9/2016 | E02D 27/425 |
| DK | 2000 00612 | A | 9/2001 | |
| EP | 3 153 627 | A1 | 4/2017 | |
| WO | WO-2011030199 | A2 * | 3/2011 | |
| WO | WO-2013044976 | A1 * | 4/2013 | |
| WO | WO-2016187720 | A1 * | 12/2016 | |
| WO | WO 2017/141098 | A1 | 8/2017 | |
| WO | WO-2018055446 | A1 * | 3/2018 | E02D 27/425 |

OTHER PUBLICATIONS

International Search Report as issued in International Patent Application No. PCT/IB2020/051465, dated Jun. 9, 2020.
CR Office Action as issued in Chinese Patent Application No. 202080017355.5, dated Jan. 5, 2023.

* cited by examiner

FOUNDATION FOR A WIND POWER PLANT

CROSS-REFERENCE TO RELATED APPLICATIONS

This application is the U.S. National Stage of International Application Serial No. PCT/IB2020/051465, filed Feb. 21, 2020, which in turn claims priority to Austrian Application No. A 79/2019, filed Feb. 28, 2019. The contents of all of these applications are incorporated herein by reference in their entirety.

The invention refers to a foundation for a wind power plant with a circular or polygonal pedestal divided into several ring sections for carrying a tower and with support elements extending radially outward from the pedestal, wherein the ring sections and the support elements are designed as prefabricated concrete elements or are assembled from prefabricated concrete elements, and wherein adjacent support elements are spaced from one another in the circumferential direction.

The invention further relates to a wind power plant with a tower which carries a rotor and which is mounted on a foundation according to the invention.

A foundation of the type mentioned at the beginning is described, for example, in WO 2017/141098 A1 and consists essentially of prefabricated concrete elements. Such concrete elements are manufactured in a prefabrication plant and transported to the place of use, where they can be brought into position using a crane and then connected to one another. In this way, the duration of the construction process on site can be reduced considerably. When connected to one another, the prefabricated concrete elements form a foundation with a central pedestal and several ribs or support elements, each of which protrudes radially outward from the pedestal. Each prefabricated concrete element forms one of the support elements and an associated circumferential portion of the pedestal. After the foundation has been put together in this way, the tower or mast of the wind turbine is erected on the pedestal and attached to the pedestal using anchor bolts.

By using prefabricated concrete elements, the elements can be manufactured in a controlled environment, so that the possibility is given to harden the concrete under optimal conditions and to monitor the process closely. The quality of the hardened concrete can be improved because there is better control of the material quality and workmanship in a prefabrication plant than in a construction site.

Wind turbines are exposed to loads and stresses of a specific nature that have to be absorbed by the foundation. The wind itself acts in an unpredictable and variable way. In the case of larger systems, there are also dynamic load components due to vibrations and resonances. Furthermore, towers with heights of 100 meters and more transfer considerable eccentric loads to the foundation due to the considerable tilting moment. When the tower is subjected to a bending moment, the concrete of the foundation must withstand the compression that occurs in the compressed zone, and the reinforcement structure of the concrete must absorb the tensile forces in the opposite part of the foundation, because the concrete itself has a relatively low tensile strength.

Foundations made of prefabricated reinforced concrete elements have the advantage that the performance and quality of the concrete are higher, so that there is a lower risk of cracking and a higher ability to withstand dynamic and static loads. One disadvantage, however, is that the individual prefabricated concrete elements must not exceed certain dimensions so that they can be transported from the prefabrication plant to the place of use.

A significant contribution to the stability of a foundation is achieved by backfilling an excavation that accommodates the foundation with earth or some other filler material, whereby this comes to rest on the prefabricated concrete elements of the foundation. In this way, the weight of the filling material can be used to exert a vertical load on the prefabricated concrete elements, which counteracts a possible overturning moment.

In order to increase the stability of a windmill foundation, in particular its resistance to a tilting moment, without increasing the length and/or the width of the prefabricated concrete elements, it was proposed in WO 2017/141098 A1 that the space between two adjacent prefabricated concrete elements should each be bridged by a bridging plate. The bridging plates provide an additional support surface for the filling material, whereby the vertical load component counteracting the overturning moment can be increased. In addition, the bridging plates lead to stabilization and mutual support of adjacent support elements, because the support elements are connected to one another to form a unitary structure, particularly in the radially outer region, that is, away from the pedestal. To secure the position of the bridging plates, they are fastened to the support elements, for example, with the aid of screw connections, which, however, entails high assembly costs.

The present invention is therefore aimed at creating a design of the foundation which at least partially retains the mentioned advantages of bridging plates, but which avoids the high assembly costs of bridging plates.

To achieve this object, the invention essentially consists in a foundation of the type mentioned at the outset, wherein adjacent support elements are each connected to one another by means of a tangentially extending beam designed as a prefabricated concrete element. The connection of two adjacent, radially extending support elements by means of a tangential beam generates a support structure formed from several triangles instead of the star-shaped support structure previously formed by the support elements. This leads to a better distribution and dissipation of forces, especially in the zone of the foundation that is compressed as a result of tilting moments. The arrangement of beams according to the invention, as in the case of the bridging plates, ensures the stabilization and mutual support of adjacent support elements without bridging plates being absolutely necessary. The effort associated with the transport and assembly of bridging plates can thus be omitted. Due to the formation of support triangles surrounding the pedestal, the radially extending support elements can be made slimmer and thus weight-optimized because the support of the tower is no longer based exclusively on a cantilever model of the radial support elements.

Of course, it is also possible to use the beams according to the invention in combination with bridging plates. In this case, however, a separate fastening of the bridging plates to the support elements with the aid of screws can be dispensed with if the beams themselves ensure radial support of the bridging plates. The beams form a form-fitting retaining means acting against radial migration of the bridging plates away from the pedestal.

A beam within the meaning of the invention is to be understood as an elongated concrete element whose longitudinal extension, extending in the tangential direction of the foundation, clearly exceeds the width and height, the longitudinal extension preferably being at least twice, preferably at least five times the width and/or height.

The term "tangential" refers to a vertical axis of the foundation around which the circular or polygonal pedestal is arranged, and expresses that the beams provided according to the invention are essentially tangential to an imaginary circle through the center of which said axis extends.

The beams according to the invention can preferably run straight. However, different shapes are also conceivable, such as beams with a curved profile.

Provision is preferably made for each pair of adjacent support elements to be connected to one another by means of a beam, so that the beams form a polygon surrounding the pedestal or the radial support elements. In other words, two beams extend from each support element, a first one in each case leading to the right-hand adjacent support element and a second one leading to the left-hand adjacent support element.

The connection of the beams to the support elements can be done in different ways, whereby it should be ensured in any case that a transmission of force between the beam and support element is made possible in the radial and possibly also in the tangential direction. A preferred embodiment provides that the ends of the beam are attached to the adjacent support elements in a form-fitting manner or with the aid of connecting means.

Advantageously, the beams are attached to the end of the adjacent support elements facing away from the pedestal. The beams are thus attached to the free ends of the support elements, so that all beams together form a circumferential, polygonal boundary of the foundation.

The beams can also take on the function of a circumferential support, in particular when the beam, in accordance with a preferred embodiment of the invention, has a cross-sectional profile with two legs, in particular an L-shaped profile, wherein one leg of the two legs is fixed to the adjacent support elements and the other leg of the two legs forms a support structure that protrudes radially outwardly from the support elements and can be supported against the ground. Such an additional support structure allows the radial support elements to be dimensioned thinner, so that overall weight optimization is achieved. In addition, the radial extension of the radial support elements can be made shorter due to the additional radial support created by the beams, so that compliance with a maximum transport length is made easier.

The radially outwardly protruding support structure can also be used as an attachment point for the attachment of further support elements, so that the radial extent of the foundation can be increased further.

According to a preferred embodiment of the invention, the space between two adjacent support elements can, as already mentioned, be each bridged by at least one bridging plate, which is preferably designed as a prefabricated concrete slab. The provision of screw connections between the at least one bridging plate and the radial support elements can be dispensed with because the at least one bridging plate can be supported radially outward against the beam.

The space between two adjacent support elements can also be bridged by a plurality of parallel bridging plates, which are designed as prefabricated concrete slabs. The bridging plates in particular run essentially in the tangential direction, with a plurality of bridging plates following each other as seen in the radial direction.

The bridging plates provide an extremely large horizontal surface on which the backfill material can exert a vertical force which counteracts the overturning moment of the windmill. The bridging plates rest on the support elements along at least part of their side edges so that the vertical load exerted by the filler material on the bridging plates can be transferred to the radial supporting elements and thus to the entire foundation.

In order to minimize the number of prefabricated concrete elements to be assembled at the place of use, a preferred development of the invention provides that a ring section and an associated support element are formed integrally with one another as a single prefabricated concrete element.

The prefabricated concrete elements are preferably made of reinforced concrete which has a reinforcement structure, in particular reinforcement elements, profiles, rods or wires, which are embedded in the prefabricated concrete elements and/or which are designed as tensioning elements for tensioning the prefabricated concrete elements together to form prestressed concrete elements.

A disadvantage of a foundation that is composed of prefabricated concrete elements is that, in contrast to foundations made of in-situ concrete poured on site, no monolithic structure is provided, so that technical solutions have to be developed for the safe connection of the prefabricated concrete elements to simulate a monolithic structure.

In this context, a preferred embodiment of the invention provides that a connection structure is provided which holds the prefabricated concrete elements forming the support elements and the pedestal together and is preferably coupled to the reinforcement structure.

The connection structure can be of any type suitable for rigidly holding the prefabricated concrete elements together to form a monolithic structure. The connection structure differs from the reinforcement structure and is therefore preferably not embedded in the prefabricated concrete elements. According to a preferred feature of the invention, the connection structure is coupled to the reinforcement structure, which enables an uninterrupted load path between the reinforcement structures, so that the forces introduced into the foundation are effectively distributed. In the context of the invention, the coupling of the connection structure and the reinforcement structure means that the forces acting on the reinforcement structure are transmitted to the connection structure without concrete being placed in between, and vice versa. Accordingly, the connection structure and the reinforcement structure can be connected to one another directly or via a rigid connecting element other than concrete.

However, the connection structure can also have no direct coupling to the reinforcement structure. For example, the ring sections of the pedestal or the support elements can be braced against one another with the aid of circumferential tensioning cables. The tensioning cables can be arranged in at least one circumferential channel of the ring section and/or of the support elements.

A preferred embodiment provides that the pedestal or its ring sections, on its or their ends facing the platform for the tower, have a circumferential projection extending radially outward from the pedestal and comprising at least one channel for receiving a tensioning cable, said channel being provided in the projection and extending in the circumferential direction. The fact that a circumferential projection is created, which extends radially outwardly from the pedestal and is attached in the upper area, i.e., at the end having the platform of the pedestal, allows to do without screwing the prefabricated concrete elements, because at least one tensioning cable, but usually a plurality of tensioning cables for tensioning the prefabricated concrete elements in the upper region of the foundation can be guided over a relatively large circumference. A tensioning cable routed over a large circumference can develop a better tensioning and joining force than tensioning cables that run on a small circumference, so that the measure according to the invention achieves highly efficient tensioning of the prefabricated concrete elements. As a result, the screwing of the concrete elements can largely or completely be dispensed with. For the introduction and tensioning of the tensioning cables, it is sufficient if the prefabricated concrete elements are positioned as close as possible to one another at the desired location, without the need for precise alignment of the drill holes with one another. The tensioning cable or the plurality of tensioning cables can then be inserted into the channel running in the projection and pulled together. The prefabricated concrete elements are pulled together and aligned with one another and the finished foundation is obtained without any screw connections.

The concrete used to make the precast concrete elements can be of any type that is typically also used for on-site pouring of concrete. In addition to aggregates and water, concrete contains Portland cement as a hydraulic binder.

Fiber-reinforced concrete can preferably also be used to produce the prefabricated concrete elements. The fibers can be made from any fiber material that helps increase the structural integrity, particularly strength, impact resistance and/or durability, of the resulting concrete structure. Fiber-reinforced concrete contains short discrete reinforcement fibers that are evenly distributed and randomly oriented.

The reinforcing fibers are preferably carbon fibers, synthetic fibers and, in particular, polypropylene fibers. Alternatively, the reinforcing fibers can be steel fibers, glass fibers or natural fibers. The use of HPC (High Performance Concrete) and UHPC (Ultra High Performance Concrete) is also possible. These types of concrete are extremely fine binders with special, extremely fine aggregates and corresponding additives and are to be regarded as advantageous due to their relatively low weight.

During operation, the foundation carries an onshore wind turbine with a tower and a rotor mounted on the tower, the tower being mounted on the pedestal of the foundation according to the invention by conventional means, for example anchor bolts. The rotor has an essentially horizontal axis of rotation.

The invention is described in more detail below with reference to the exemplary embodiments shown in the drawing.

Figure 2:
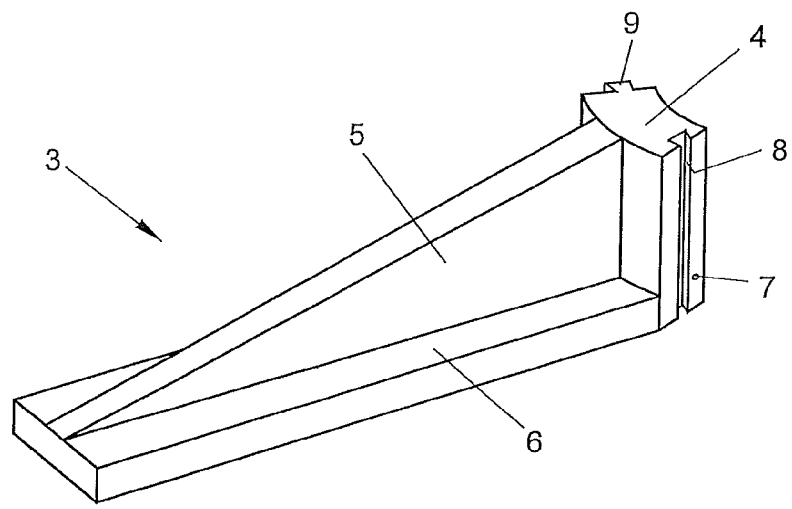
Figure 3:
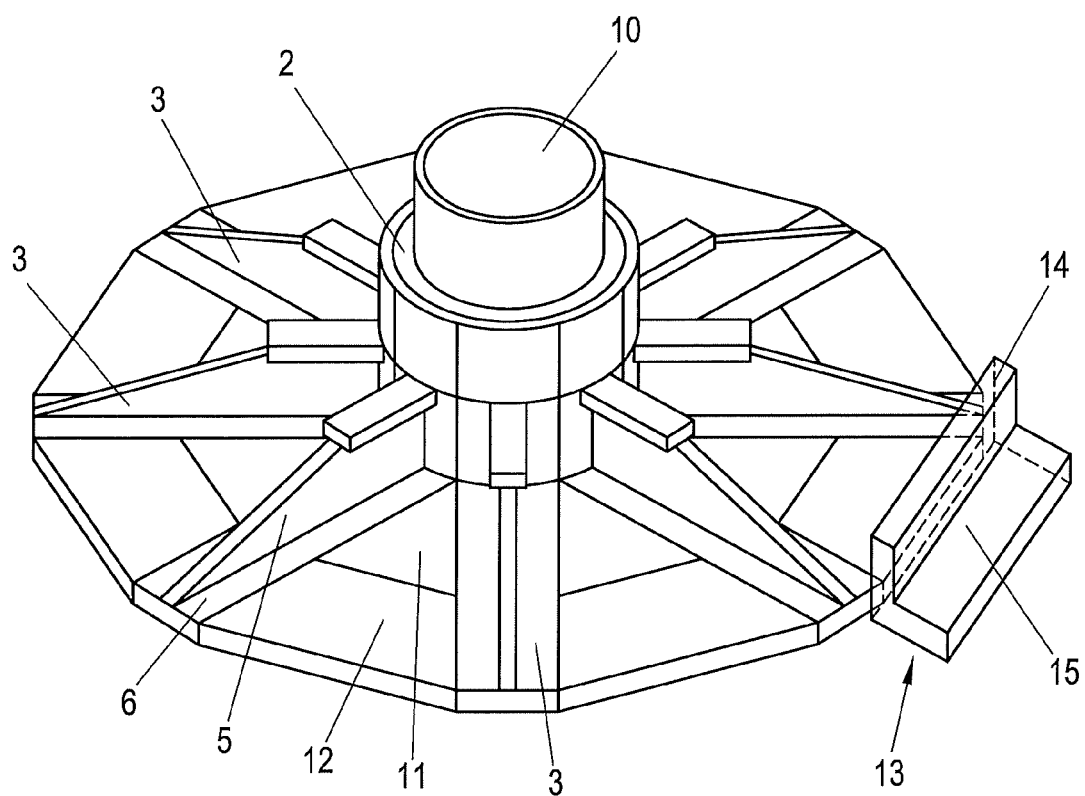

FIG. 1 shows a foundation for a wind power plant, which consists of prefabricated concrete elements, FIG. 2 shows a prefabricated concrete element which is used in the foundation of FIG. 1, and FIG. 3 shows an inventive design of the foundation with bridging plates and outer support beams.

FIG. 1 shows a foundation 1 which has a number of prefabricated concrete elements 3. The foundation 1 has a circular pedestal 2 in the form of a hollow cylinder for supporting a tower of a wind turbine. The foundation 1 also has a plurality of support elements 5 which protrude radially outward from the pedestal 2. The pedestal 2 is divided into several circumferential sections 4 (FIG. 2), a circumferential section 4 and a support element 5 each being formed integrally with one another as a prefabricated concrete element 3, as shown in FIG. 2. The support element 5 or the prefabricated concrete element 3 also has a base plate 6, which is also formed integrally with the support element 5. The prefabricated concrete elements 3 consist of reinforced concrete with reinforcing rods which are embedded in the prefabricated concrete elements 3.

Although the support elements are shown in FIG. 2 as a prefabricated concrete element which consists of a single piece, the support elements can also be composed of two or more sections. This is particularly advantageous if a support element is to be implemented whose radial length exceeds the permissible length of conventional transport devices. In particular, two or more sections can be produced as separate prefabricated concrete elements, which are transported separately to the place of use and rigidly mounted to one another at the place of use.

For precise alignment of the adjacent circumferential sections 4 with one another, the side surfaces can have interlocking form-fitting elements 8 and 9 in the manner of a trapezoidal tongue and groove arrangement, which cooperate with one another in order to ensure the relative position of the elements 3. Furthermore, the prefabricated concrete elements 3 can be tightened to one another by at least one tensioning cable, wherein the at least one tensioning cable can be arranged in a circumferential, in particular circular passage formed in the pedestal 2, the opening of the passage being denoted by 7. Of course, several passages can also be provided.

FIG. 3 shows the embodiment according to the invention, in which the space between two adjacent prefabricated concrete elements 3 is bridged by bridging plates 11 and 12. The bridging plates 11 and 12 do not have to be fastened to the base plate 6 of the prefabricated concrete elements 3 by bolts, but can only rest positively on the support elements. To fix the bridging plates 11, 12, tangential beams 13 are provided which each connect two adjacent support elements 3 to one another. The tangential beams 13 form a stop which prevents the bridging plates 11, 12 from moving away from the pedestal 2. For the sake of clarity, only one of the beams 13 is shown in FIG. 3. Since each pair of adjacent support elements 3 is connected to one another by means of a beam 13, a total of eight beams 13 are provided in the present example, so that the beams 13 together form a polygonal, in particular octagonal, outer edge of the foundation.

In the embodiment according to FIG. 3, the beams 13 are designed as angled supports which have an L-shaped cross section with a first leg 14 and a second leg 15. The second leg 15 extends radially outward and has a ground support surface with which the beam 13 can be supported on the ground. This provides additional support for the foundation.

A lower section of the tower of the wind power plant to be fastened to the pedestal 3 is denoted by 10 in FIG. 3.

The invention claimed is:

1. A wind power plant foundation, comprising a circular or polygonal pedestal divided into several ring sections for carrying a tower and support elements extending radially outward from the pedestal, wherein the ring sections and the support elements are designed as prefabricated concrete elements or are assembled from prefabricated concrete elements, wherein adjacent support elements are spaced from one another in the circumferential direction, and wherein adjacent support elements are each connected with one another by means of a tangentially extending beam designed as a prefabricated concrete element, wherein the tangentially extending beam has a cross-sectional profile with two legs, wherein one leg of the two legs is fixed to the adjacent support elements and the other leg of the two legs forms a support structure that protrudes radially outwardly from the adjacent support elements and is adapted to be supported against the ground, wherein a space between two adjacent support elements is bridged by at least one bridging plate, the at least one bridging plate being designed as a separate concrete element from the two adjacent support elements and bridging the two adjacent support elements without being fastened to said two adjacent support elements, and wherein the at least one bridging plate is supported radially outwardly against the tangentially extending beam such that the tangentially extending beam forms a stop that prevents the at least one bridging element from moving radially away from said space.

2. The foundation according to claim 1, wherein ends of the tangentially extending beam are fastened to the adjacent support elements in a form-fitting manner or with the aid of a fastener.

3. The foundation according to claim 1, wherein the tangentially extending beam is attached to ends of the adjacent support elements facing away from the pedestal.

4. The foundation according to claim 1, wherein at least one ring section of the several ring sections and an associated support element of the support elements are formed integrally with one another as a single prefabricated concrete element.

5. The foundation according to claim 1, wherein the prefabricated concrete elements consist of reinforced concrete which has a reinforcement structure.

6. The foundation according to claim 5, wherein the reinforcement structure includes reinforcement elements, profiles, rods or wires, which (a) are embedded in the prefabricated concrete elements or which (b) are designed as tensioning elements for bracing the prefabricated concrete elements together to form stressed concrete elements, or both (a) and (b).

7. The foundation according to claim 1, wherein a connection structure is provided which holds the prefabricated concrete elements forming the support elements and the pedestal together.

8. The foundation according to claim 7, wherein the connection structure is coupled to a reinforcement structure of the prefabricated concrete elements.

9. Wind power plant with a tower carrying a rotor, wherein the tower is mounted on a foundation according to claim 1.

10. The foundation according to claim 1, wherein cross-sectional profile is an L-shaped profile.

11. The foundation according to claim 1, wherein the at least one bridging plate is designed as a prefabricated concrete slab.

* * * * *